(12) United States Patent
Ramanathan et al.

(10) Patent No.: US 8,250,147 B2
(45) Date of Patent: Aug. 21, 2012

(54) REMOTE CALL CONTROL AND CONFERENCING USING PAIRED DEVICES

(75) Inventors: Rajesh Ramanathan, Redmond, WA (US); Adrian Potra, Redmond, WA (US); Vinit Deshpande, Woodinville, WA (US); Ankit Tandon, Bellevue, WA (US); Stephen Houchen, Redmond, WA (US); Anton Krantz, Kirkland, WA (US); Sachin Sheth, Redmond, WA (US); Pradipta Kumar Basu, Redmond, WA (US); Sriram Parameswar, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 238 days.

(21) Appl. No.: 12/146,433

(22) Filed: Jun. 25, 2008

(65) Prior Publication Data

US 2009/0327426 A1 Dec. 31, 2009

(51) Int. Cl.
*G06F 15/16* (2006.01)

(52) U.S. Cl. ........ 709/205; 709/204; 709/203; 709/227; 709/228

(58) Field of Classification Search .................. 709/205, 709/204, 203, 227, 228
See application file for complete search history.

(56) References Cited

U.S. PATENT DOCUMENTS

| | | | |
|---|---|---|---|
| 7,295,663 B2 | 11/2007 | McLaughlin et al. | |
| 7,299,008 B2 | 11/2007 | Gluck | |
| 2004/0034723 A1* | 2/2004 | Giroti | 710/8 |
| 2004/0208303 A1 | 10/2004 | Rajagopalan et al. | |
| 2005/0114147 A1* | 5/2005 | Kumaran et al. | 705/1 |
| 2005/0130631 A1 | 6/2005 | Maguire et al. | |
| 2005/0254440 A1 | 11/2005 | Sorrell | |
| 2006/0053379 A1* | 3/2006 | Henderson et al. | 715/751 |
| 2006/0293073 A1* | 12/2006 | Rengaraju et al. | 455/518 |
| 2007/0003061 A1 | 1/2007 | Jung et al. | |
| 2007/0033251 A1 | 2/2007 | Mandalia et al. | |
| 2007/0260682 A1 | 11/2007 | Guccione | |
| 2007/0263556 A1* | 11/2007 | Harris et al. | 370/312 |
| 2007/0263830 A1 | 11/2007 | Wengrovitz et al. | |
| 2008/0215680 A1* | 9/2008 | Salesky et al. | 709/204 |
| 2009/0089683 A1* | 4/2009 | Thapa | 715/756 |

OTHER PUBLICATIONS

Ramanathan, "How Presence Powers OCS 2007", Technet Magazine, Microsoft Corporation, 2008, pp. 6.
Hickey, "Unified Communications News", Mar. 13, 2007, TechTarget, pp. 3.
Gregory, et al., "SIP Communications for Dummies", Wiley Publishing, Inc., 2006, pp. 72.

* cited by examiner

*Primary Examiner* — Lan-Dai T Truong
(74) *Attorney, Agent, or Firm* — Capitol City TechLaw; Richard C. Irving

(57) ABSTRACT

In one embodiment, a user paired controller communication device may pair with a user paired server communication device. The user paired controller communication device may direct the user paired server communication device to execute a first mode communication session of a multimodal conversation, such as a voice session. The user paired controller communication may execute a second mode communication session of the multimodal conversation, such as an instant messaging session.

20 Claims, 16 Drawing Sheets

*300*

400

700

800

*900*

*1200*

REMOTE CALL CONTROL AND CONFERENCING USING PAIRED DEVICES

BACKGROUND

A personal computer that integrates internet functionality may be used to greatly increase the ability of a user to communicate across several modalities. A user may contact a communication partner using electronic mail, or e-mail, in which a discrete set of text may be sent from the user to the communication partner at a time convenient to an e-mail server. The user may associate a file or application with the text, sending the file or application as an attachment to the e-mail. A user may enact a real-time conversation with a communication partner using instant messaging, in which sets of text may be exchanged between the user and the communication partner instantaneously.

The personal computer may integrate services normally associated with other devices. A personal computer with audio input and output capability may be modified by software to act as a telephone for the user. The user may exchange real-time audio data with a communication partner, allowing a conversation to take place. Further, a personal computer with digital image capturing capability may act as a video telephone. A user and a communication partner may exchange synchronized video and audio data, allowing a greater flexibility in the types of communications that may take place.

Many existing communication technologies may integrate these computing innovations. One example would be the internet protocol (IP) telephone. An IP telephone may use voice over IP (VOIP) to transmit telephone calls over the internet, rather than a public switched telephone network.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to paired communication devices executing multi-modal communication sessions. A user paired controller communication device may pair with a user paired server communication device, possibly via a universal serial bus connection or an Ethernet connection. The user paired controller communication device may direct the user paired server communication device to execute a first mode communication session of a multimodal conversation, such as a voice session. The user paired controller communication device may execute a second mode communication session of a multimodal conversation, such as an instant messaging session.

DRAWINGS

In order to describe the manner in which the above-recited and other advantages and features can be obtained, a more particular description is described below and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

Figure 14A:
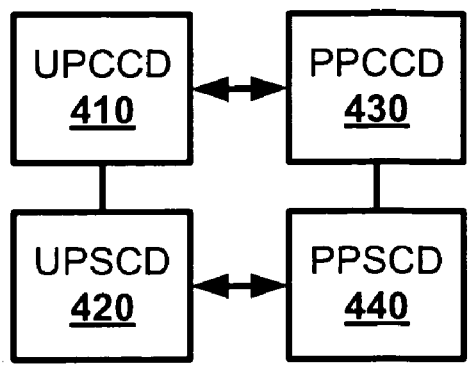
Figure 14B:
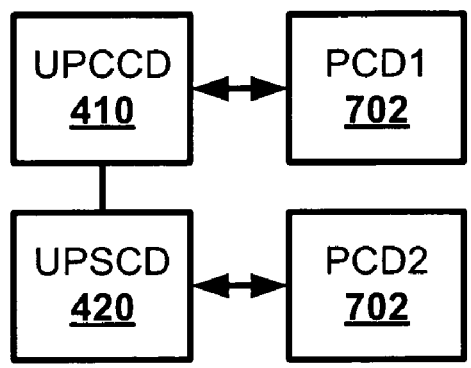
Figure 14C:
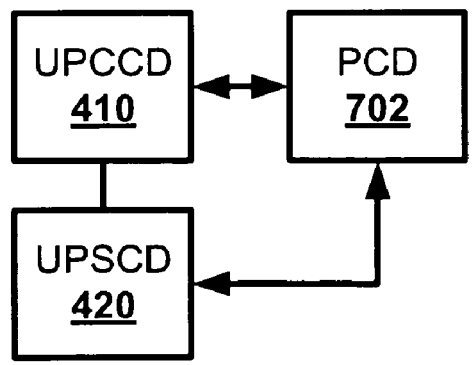

FIGS. 14a-c illustrates, in a block diagram, initial configurations from which a user may escalate to a conference communication session.

Figure 15:
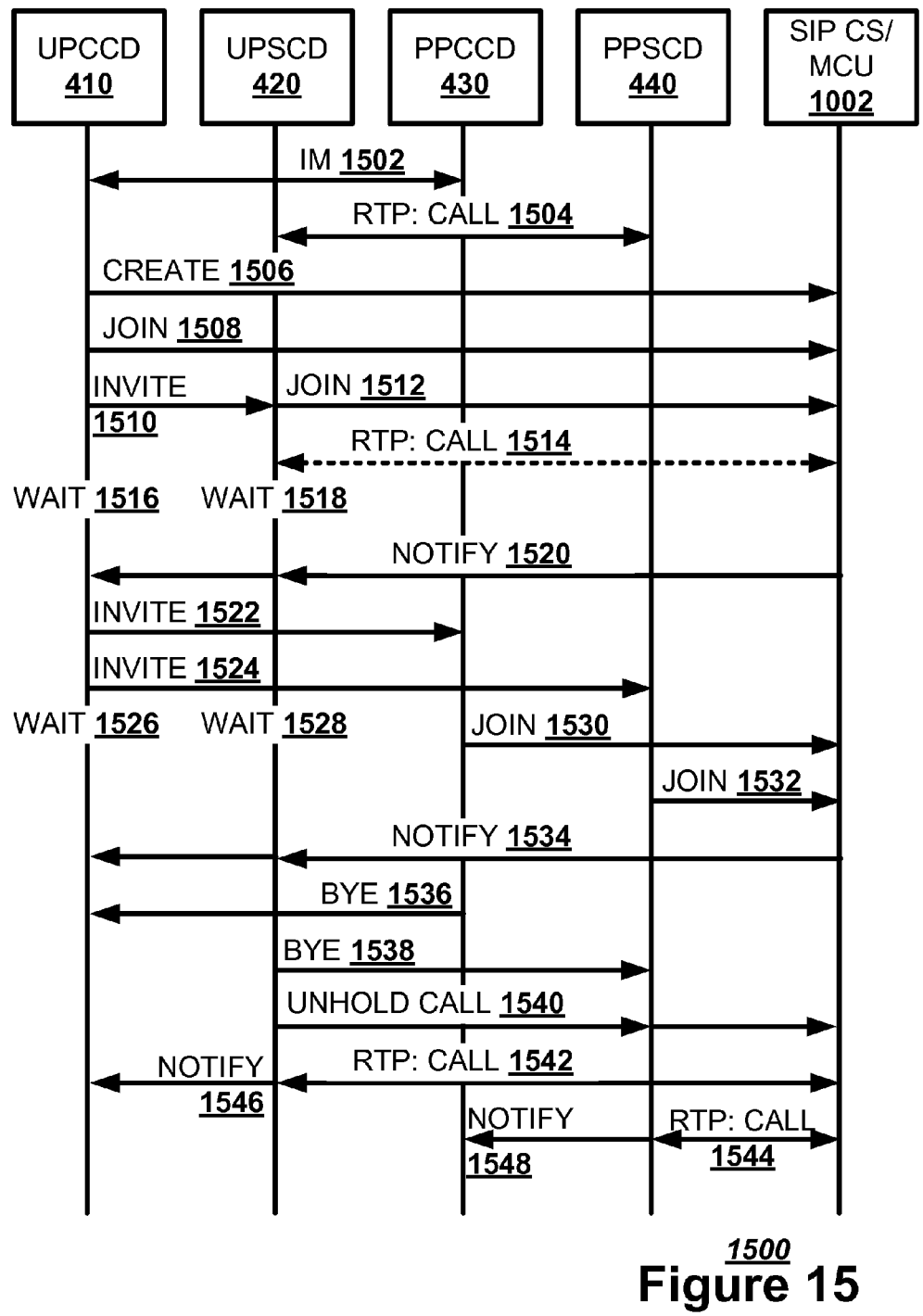

FIG. 15 illustrates, in a call flow diagram, one embodiment of a method for adding a conference communication partner.

Figure 16:
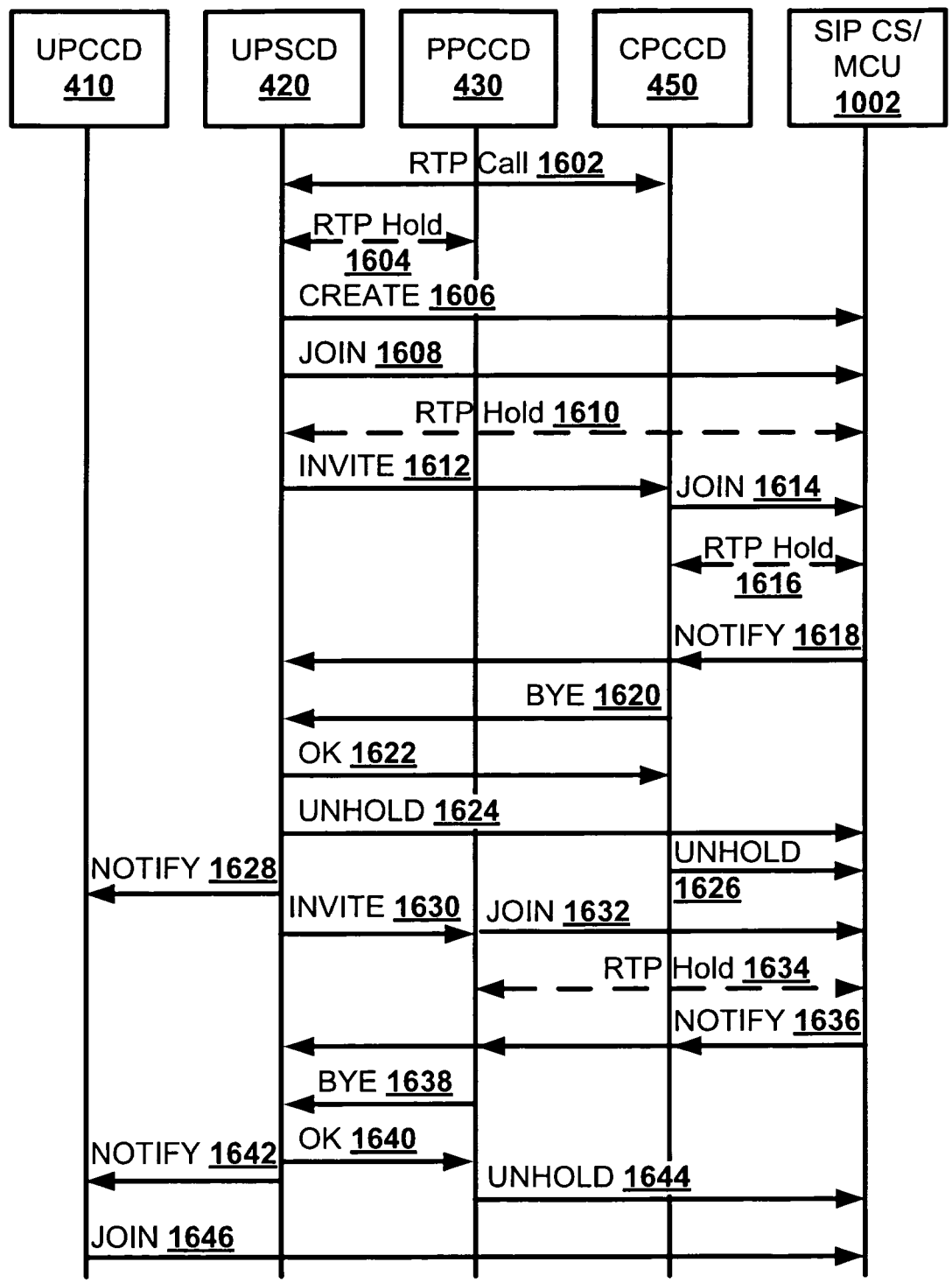

FIG. 16 illustrates, in a call flow diagram, one embodiment of a method for merging two call communication sessions into a conference communication.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure.

A user may have multiple points of presence (MPOP) on a communication network through the use of multiple communication devices. The communication devices may be "paired" together to execute multimodal communication sessions, or multimodal conversations. Pairing the communication devices allows a user to use one or more communication devices to control other communication devices representing the MPOP of that user. The user may use multiple communication devices to execute multiple communication sessions in multiple modes, such as text, instant messaging (IM), voice, video conferencing, and others.

Figure 1:
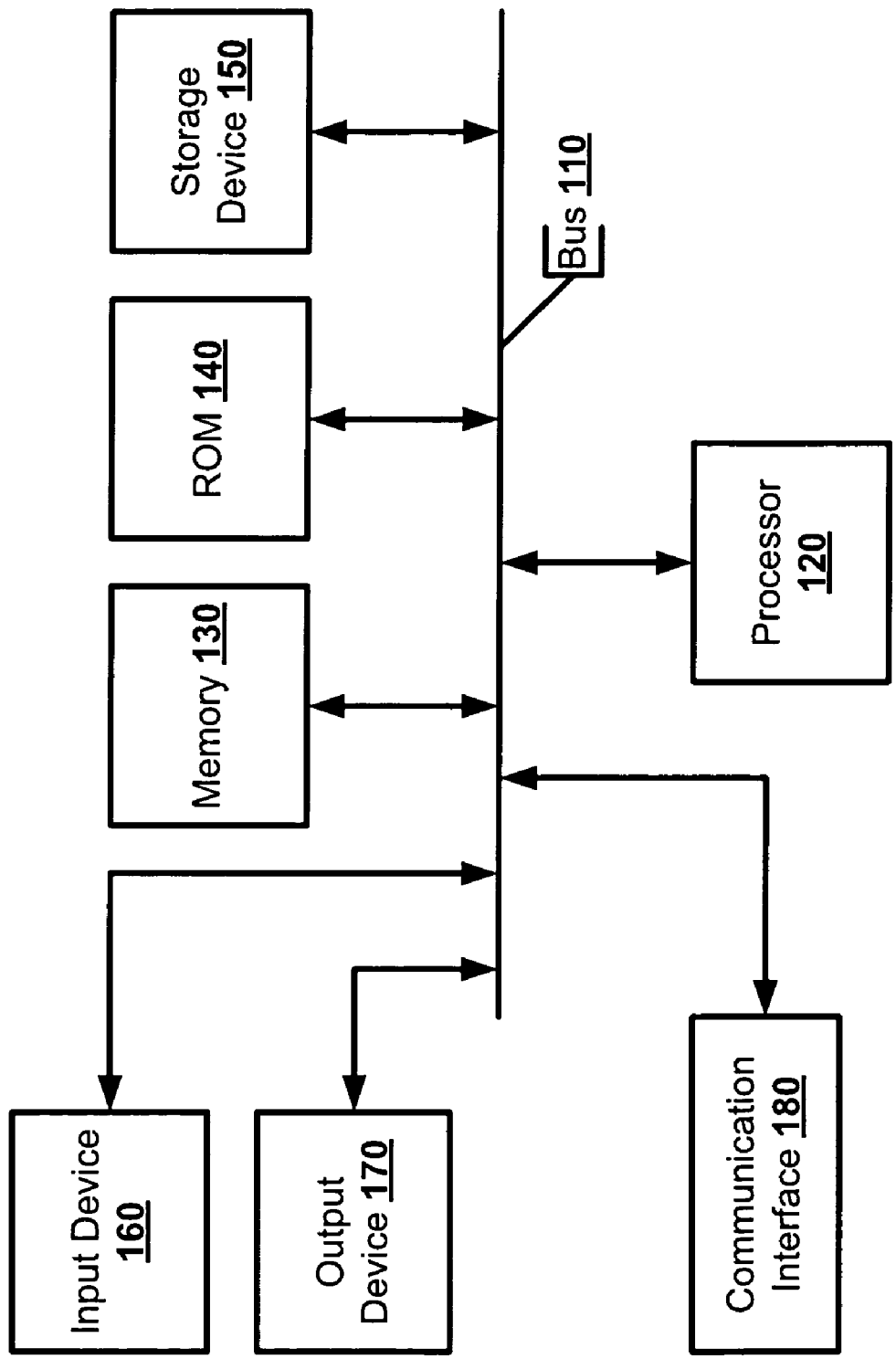
FIG. 1 illustrates a block diagram of an exemplary communication device that may be used in multimodal communications.

FIG. 1 illustrates a block diagram of an exemplary communication device 100 that may be used in multimodal communications. Communication device 100 may be a personal computer, laptop, an internet protocol (IP) telephone, or other communication device capable of acting as an independent communication device. Communication device 100 may include a bus 110, a processor 120, a memory 130, a read only memory (ROM) 140, a storage device 150, a user input device 160, a user output device 170, and a communication interface 180. Bus 110 may permit communication among the components of communication device 100.

Processor 120 may include at least one conventional processor or microprocessor that interprets and executes instructions. Memory 130 may be a random access memory (RAM) or another type of dynamic storage device that stores information and instructions for execution by processor 120. Memory 130 may also store temporary variables or other intermediate information used during execution of instructions by processor 120. ROM 140 may include a conventional ROM device or another type of static storage device that stores static information and instructions for processor 120. Storage device 150 may include any type of media, such as, for example, magnetic or optical recording media and its corresponding drive.

User input device 160 may include one or more conventional mechanisms that permit a user to input information to communication device 100, such as a keyboard, a mouse, a pen, a voice recognition device, a microphone, a headset, etc. User output device 170 may include one or more conventional mechanisms that output information to the user, including a display, a printer, one or more speakers, a headset, or a medium, such as a memory, or a magnetic or optical disk and a corresponding disk drive. Communication interface 180 may include any transceiver-like mechanism that enables processing device 100 to communicate with other devices or networks. The interface may be a wireless, wired or optical interface. In one embodiment, the interface may include a universal serial bus (USB) interface or a Bluetooth® interface.

Communication device 100 may perform such functions in response to processor 120 executing sequences of instructions contained in a computer-readable medium, such as, for example, memory 130, a magnetic disk, or an optical disk. Such instructions may be read into memory 130 from another computer-readable medium, such as storage device 150, or from a separate device via communication interface 180.

Figure 2:
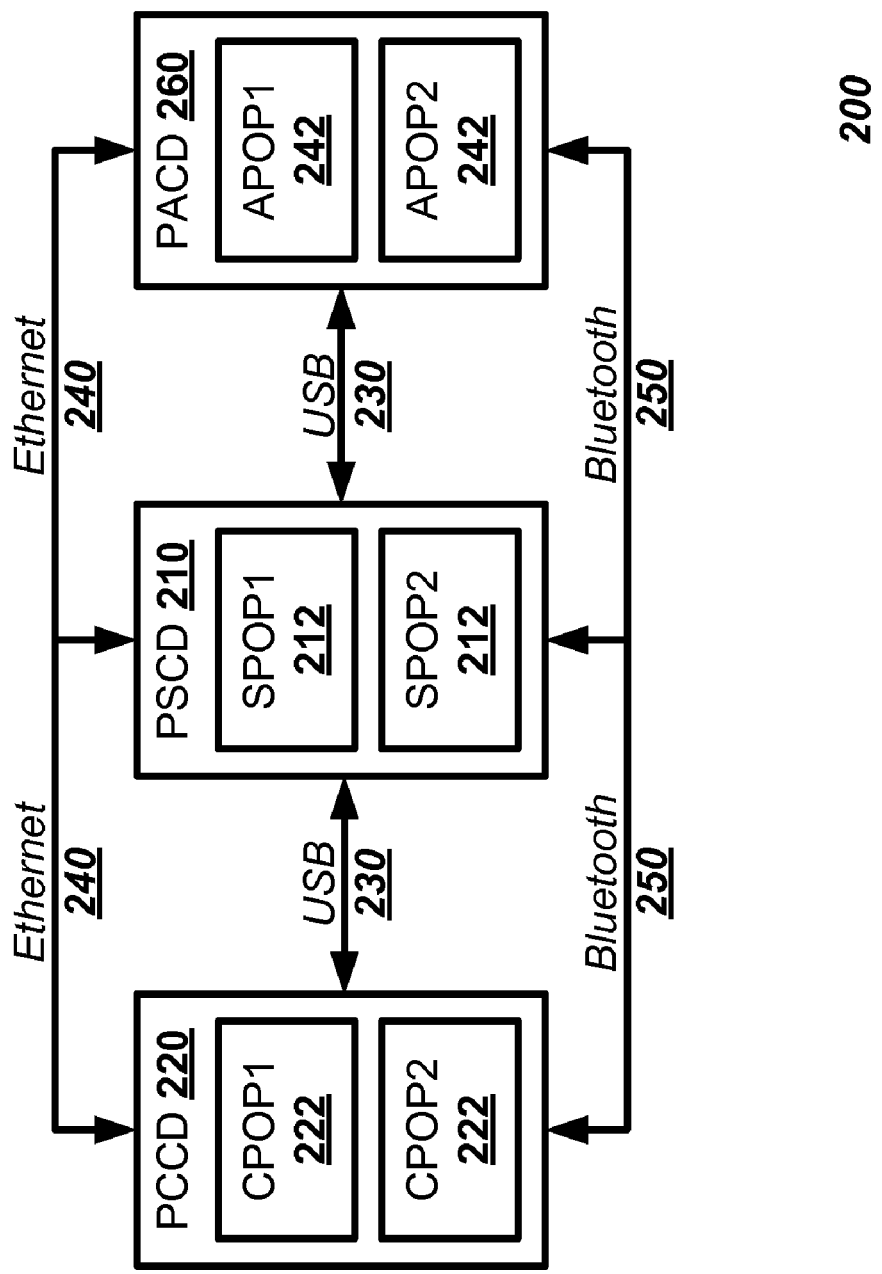
FIG. 2 illustrates, in a block diagram, one embodiment of a set of paired communication devices.

Multiple communication devices may be more easily managed by pairing. FIG. 2 illustrates in a block diagram one embodiment of a set 200 of paired communication devices. A paired server communication device (PSCD) 210 may be a communication device that may act as a server and directly connect with another communication device. PSCD 210 may be an internet protocol (IP) telephone, a computer, or other communication device that may independently create a communication link with another communication device. PSCD 210 may implement one or more server points of presence (SPOP 212) capable of communicating over multiple communication modes, such as a personal computer executing a communication software package running a voice session and an IM session. A point of presence may refer to an endpoint by which a user controls and interacts with the user's end of a communication session. PSCD 210 may execute a server-side unified communications software application that creates a call connection with another communication device using a peer-to-peer protocol.

A paired controller communication device (PCCD) 220 may be a communication device that may act as a controller for PSCD 210 to control a communication session. For example, if PSCD 210 is an IP phone creating a voice call communication session, PCCD 220 may be a personal computer that may place the voice call on hold or make other changes to the session status. PCCD 220 may act as an independent communication device, capable of setting up a communications link independent of PSCD 210. PCCD 220 may be an IP telephone, a computer, or other independent communication device. PCCD 220 may execute a client-side unified communications software application that enables control of PSCD 210. PCCD 220 may direct PSCD 210 to initiate a communication session. Alternately, PSCD 210 may independently initiate a communication session or take other independent actions regarding the communication session and then may notify PCCD 220.

PCCD 220 may implement one or more controller points of presence (CPOP 222) capable of communicating over multiple communication modes. As PSCD 210 may implement multiple SPOP 212, two paired communication devices may participate in a conversation having more than two modes of communication. For example, PSCD 210 may have a first SPOP 212 executing a first mode communication session, such as audio, and PCCD 220 may have a first CPOP 222 executing a second mode communication session, such as video or application sharing. Additionally, a third mode communication, such as text, may be executed by either a second SPOP 212 of PSCD 210 or a second CPOP 222 of PCCD 220.

PCCD 220 may pair with PSCD 210 using a variety of techniques. PCCD 220 may create a data link with PSCD 210 using a universal serial bus (USB) connection 230, an Ethernet connection 240, a Bluetooth® connection 250, or other type of data connection. A communication software program executed by PCCD 220 may then interact with a communication software program executed by PSCD 210. PSCD 210 and PCCD 220 may act as an integrated system once paired. PSCD 210 may act as PCCD 220 in one instance and PSCD 210 in a different instance, and vice versa. PCCD 220 may eschew an intermediary server when pairing directly with PSCD 210. PCCD 220 may use a third party control protocol (TPCP) to observe, initiate, and control sessions between PCCD 220 and PSCD 210 and any remote device connected to either PCCD 220 and PSCD 210.

While PSCD 210 and PCCD 220 are referred to as "paired", more than two devices may be associated with each other. For example, paired ancillary communication device (PACD) 260 may be paired with PSCD 210 and PCCD 220. PACD 260 may be an IP telephone, computer, or other communication device that may execute a communication mode over a communication connection. PACD 260 may be a second server communication device controlled by PCCD 220 or a second controller communication device controlling PSCD 210. PACD 240 may implement one or more ancillary points of presence (APOP 242) capable of communicating over multiple communication modes.

Figure 3:
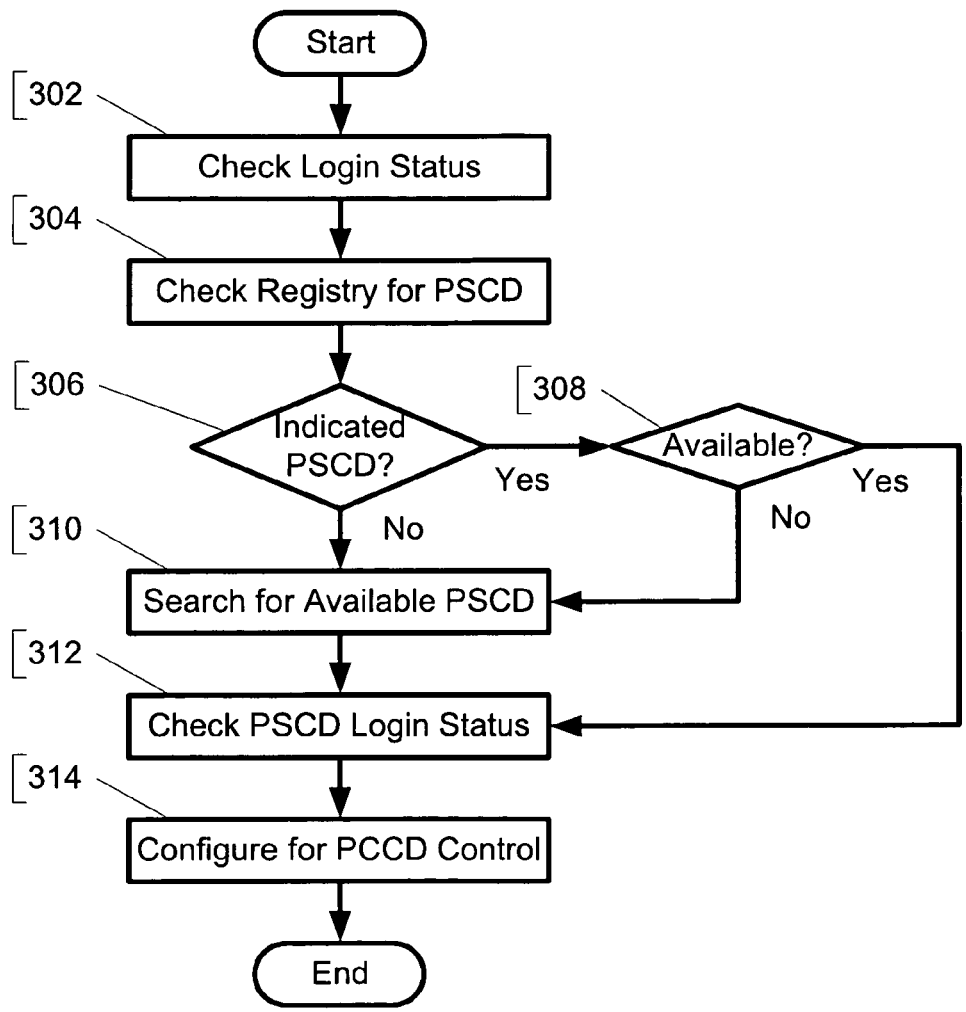
FIG. 3 illustrates, in a block diagram, one embodiment of a method for a communication device to pair with another communication device.

FIG. 3 illustrates, in a flowchart, one embodiment of a method 300 for a communication device to pair with another communication device. PCCD 220 may check a login status of a user with regards to a client-side unified communications software application (Block 302). PCCD 220 may check a registry to see if a user has indicated PSCD 210 as a first choice option (Block 304). If PCCD 220 does not have a user indicated PSCD 210 (Block 306) or user indicated PSCD 210 is unavailable (Block 308), PCCD 220 may search for an available PSCD 210 (Block 310). An available PSCD 210 may be any PSCD 210 that is connected to PCCD 220 by a USB cable 230, Ethernet connection 240, Bluetooth® connection 250, or other data connection. Once PCCD 220 has selected a PSCD 210, PCCD 220 may check the login status of the user with regards to the server-side of the unified communication software application (Block 312). PCCD 220 may configure PSCD 210 for control by PCCD 220 (Block 314). PCCD 220 may send and receive data with PSCD 210 prior to any actual pairing of the devices.

Figure 4:
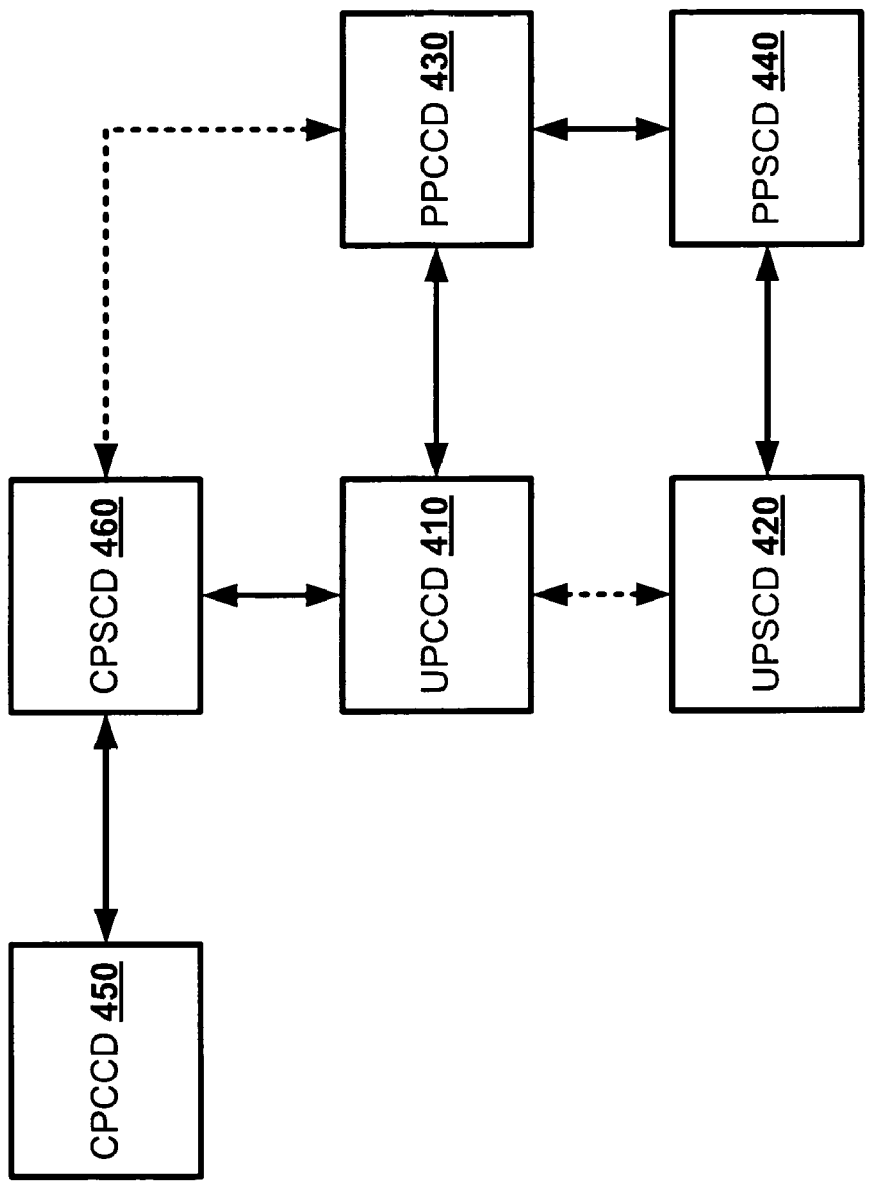
FIG. 4 illustrates, in a block diagram, one embodiment of a paired communication device connection.

FIG. 4 illustrates, in a block diagram, one embodiment of a paired communication device communication connection 400. A user may be associated with a user PCCD (UPCCD) 410 and a user PSCD (UPSCD) 420. The user may seek to create a communication link with a communication partner. The communication partner may be associated with a partner PCCD (PPCCD) 430 and a partner PSCD (PPSCD) 440. UPSCD 420 may establish a communication connection with PPSCD 440. UPCCD 410 and UPSCD 420 may each execute a communication session with either PPCCD 430 or PPSCD 440. Each communication session may use a different mode of communication, such as IM, telephone conversation, video-conferencing, or other communication modes.

The user or the communication partner may conference a conference communication partner into a communication session between a user and a communication partner. The conference communication partner may be associated with a conferences PCCD (CPCCD) 450 and a conferences PSCD (CPSCD) 460. UPCCD 410 may directly conference CPSCD 460 into the communication session or may request UPSCD 420 to conference CPSCD 460 into the communication session, regardless of whether the communication session was initiated by the user or the communication partner.

Figure 5:
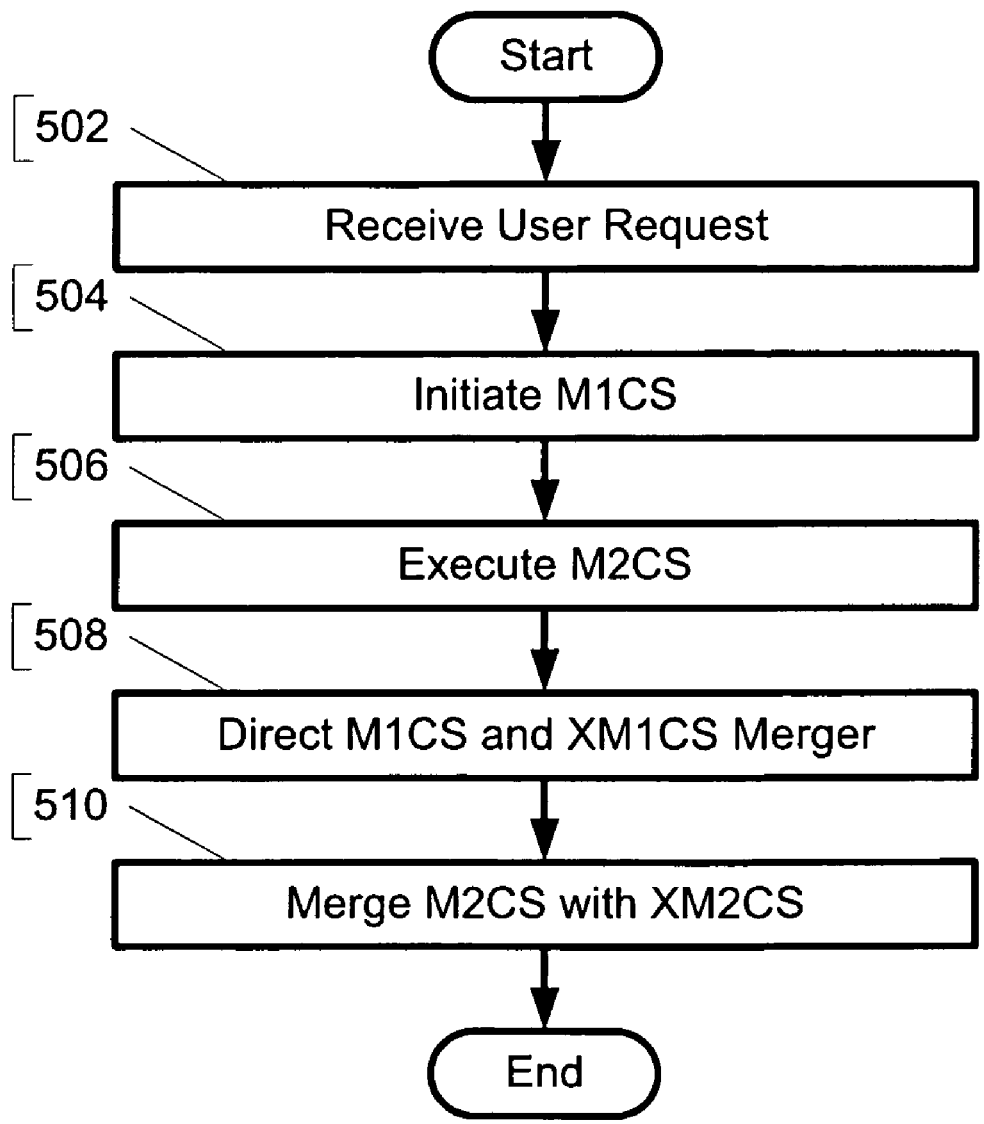
FIG. 5 illustrates, in a flowchart, one method for using a user paired controller communication device for multimodal conversation between users.

FIG. 5 illustrates, in a flowchart, one method 500 for using a UPCCD 410 for a multimodal conversation between users with MPOP. A UPCCD 410 may receive a user request to activate a communication session (Block 502). UPCCD 410 may initiate creation by a UPSCD 420 of a first mode communication session (M1CS), such as IM session or telephony session, with PPSCD 440 (Block 504). UPCCD 410 may execute a second mode communication session (M2CS), such as IM session or telephony session, with PPSCD 440 or with PPCCD 430 (Block 506). UPCCD 410 may direct UPSCD 420 to merge an external first mode communication session (XM1CS) between UPSCD 420 and a CPSCD 460 with the M1CS to create a first mode conference communication session (M1CCS) (Block 508). UPCCD 410 may merge an external second mode communication session (XM2CS) between UPCCD 410 and a CPCCD 450 with the M2CS to create a second mode conference communication session (M2CCS) (Block 510).

Figure 6:
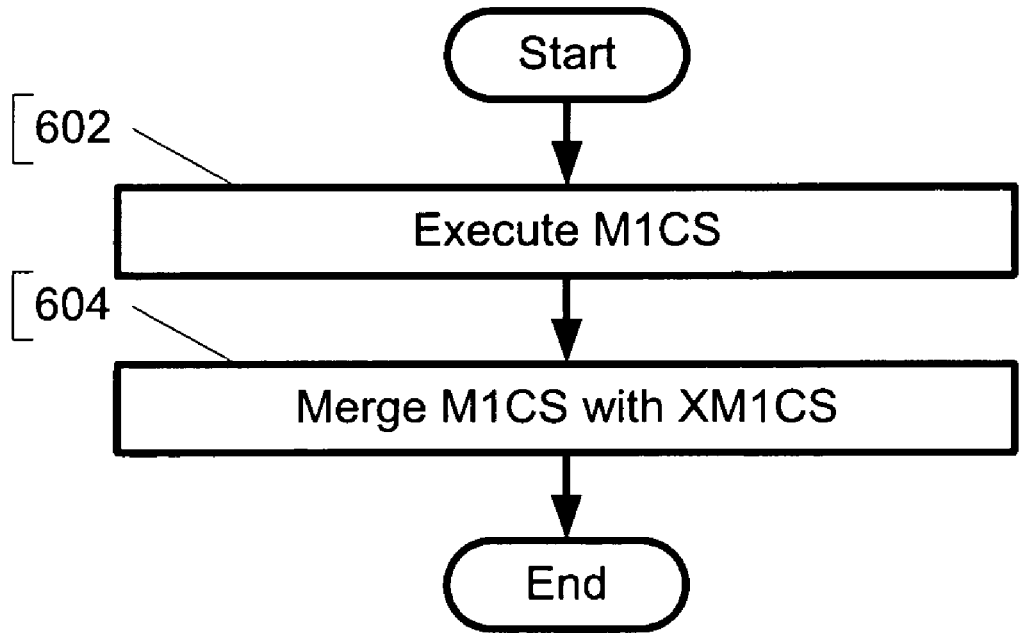
FIG. 6 illustrates, in a flowchart, one method for executing a multimodal conversation between users with a user paired server communication device.

FIG. 6 illustrates, in a flowchart, one method 600 for executing a multimodal conversation between users with a UPSCD 420. UPSCD 420 may execute a M1CS, such as IM session or telephony session, with PPSCD 440 or with PPCCD 430 (Block 602). UPSCD 420 may merge an XM1CS between UPSCD 420 and a CPSCD 460 with the M1CS to create a M1CCS (Block 604), either independently or at the behest of UPCCD 410.

Figure 7:
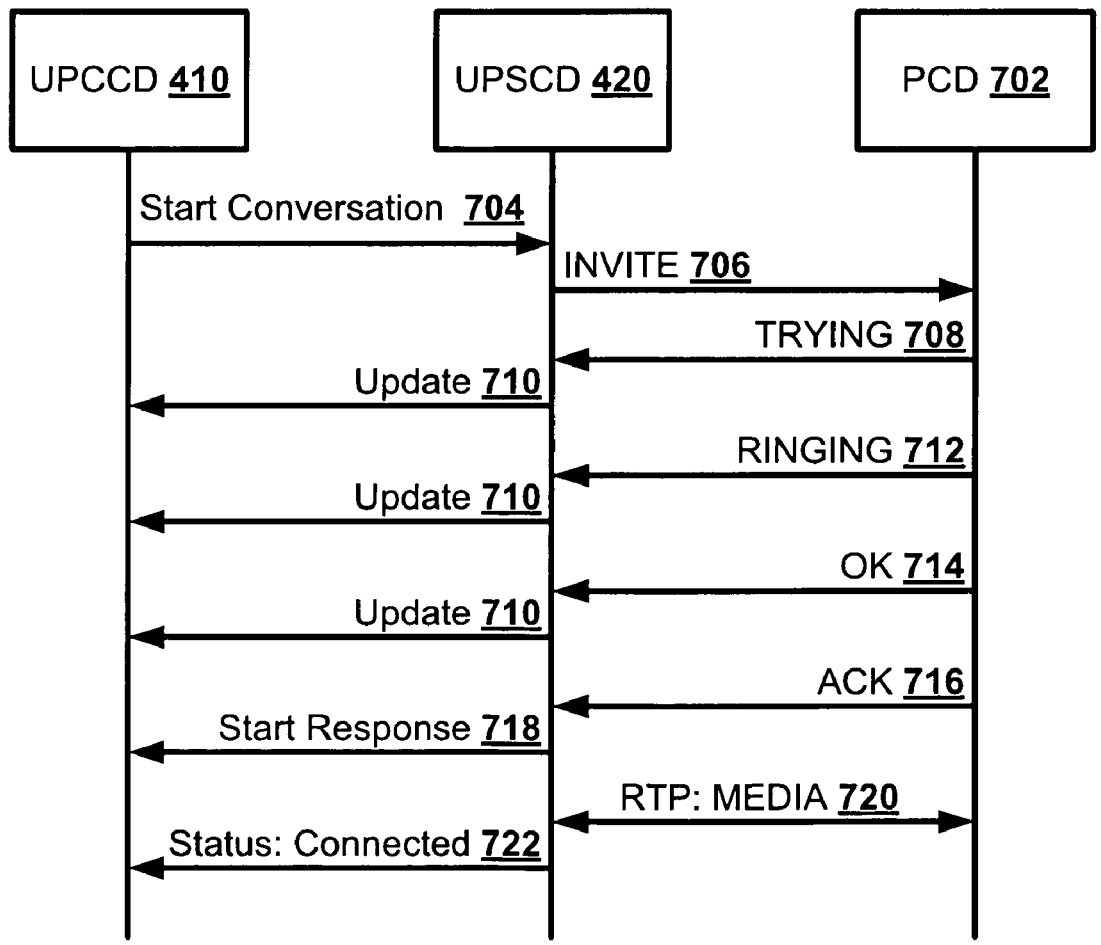
FIG. 7 illustrates, in a call flow diagram, one embodiment of a method for creating a call session with a set of paired devices.

FIG. 7 illustrates, in a call flow diagram, one embodiment of a method 700 for creating a call session with a set of paired devices. UPCCD 410 and UPSCD 420 may create a call session with a partner communication device (PCD) 702 associated with a communication partner. PCD 702 may be a device unpaired with another device, or may be paired with one or more devices. PCD 702 may have multiple points of presence on the network, as defined above. UPCCD 410 may send a TPCP message initiating a conversation, or a "Start Conversation" message 704, to UPSCD 420. UPSCD 420 may send an "INVITE" message 706 to PCD 702, asking PCD 702 to join in a communication session, such as a telephone conversation. PCD 702 may send an indication message to UPSCD 420 indicating that PCD 702 is trying to connect the communication partner with the user, or a "TRYING" message 708. UPSCD 420 may send a status update message 710 to UPCCD 410 after each change in status to UPSCD 420 or PCD 702, indicating users of each device, endpoints of the device, and a status of UPSCD 420 ("OFFERING") and the PCD 702 ("TRYING"). UPCCD 410 may send an acknowledgment to UPSCD 420 after each status update message 710. UPCCD 410 may display a state of the communication session on user output device 170 to the user based upon status update message 710. PCD 702 may send a message to UPSCD 420 indicating that PCD 702 is trying to contact the communication partner about the user, or a "RINGING" message 712. PCD 702 may send a message to the UPSCD 420 indicating that PCD 702 has reached the communication partner, or an "OK" message 714. PCD 702 may send a message to UPSCD 420 indicating that the communication partner is joining the communication session, or an "ACK" message 716. UPSCD 420 may send a TPCP message prompting the user to start responding to the conversation, or a "Start Response" message 718, to UPCCD 410. PCD 702 and UPSCD 420 may start a media communication session 720 using a real-time transport protocol (RTP), such as a voice communication session. UPSCD 420 may send a status update message 722 to UPCCD 410 indicating that a status of UPSCD 420 and PCD 702 is "Connected".

Figure 8:
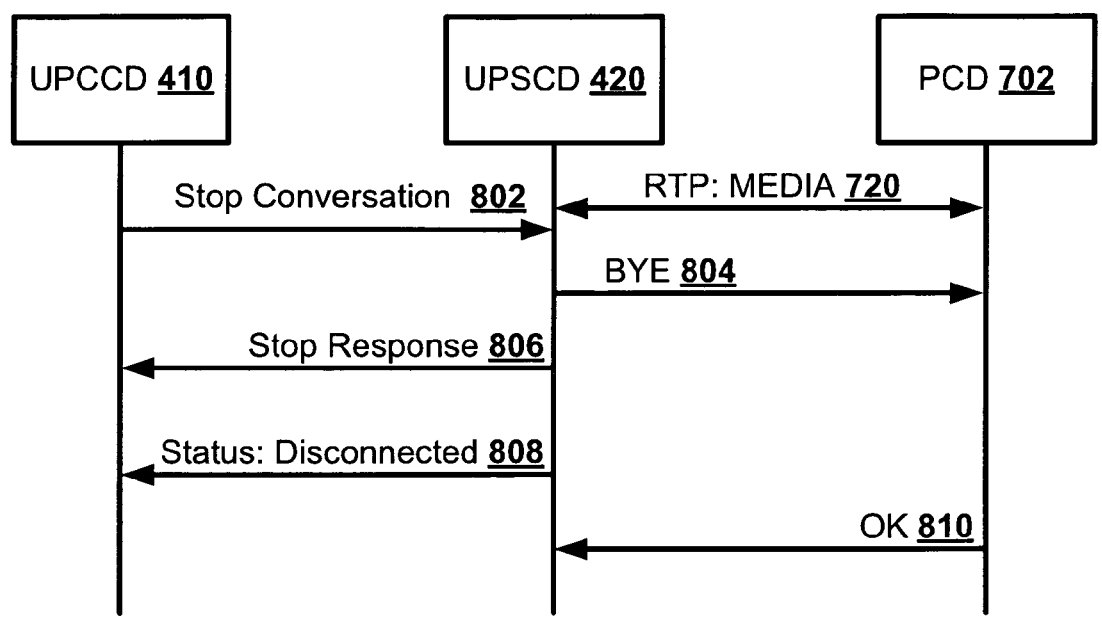
FIG. 8 illustrates, in a call flow diagram, one embodiment of a method for ending a call session with a set of paired devices.

FIG. 8 illustrates in a call flow diagram one embodiment of a method 800 for ending a call session with a set of paired devices. PCD 702 and UPSCD 420 may be in a RTP media communication session 720. UPCCD 410 may send a TPCP message indicating a desire to end the communication session, or a "Stop Conversation" message 802, to UPSCD 420. UPSCD 420 may send a "BYE" message 804 to PCD 702, asking PCD 702 to end the communication session. UPSCD 420 may send a TPCP message alerting the user that the conversation is over, or a "Stop Response" message 806, to UPCCD 410. UPSCD 420 may send a status update message 808 to UPCCD 410 indicating that the status of UPSCD 420 and PCD 702 is "Disconnected". PCD 702 may send a message indicating acknowledgement of the end of the session, or an "OK" message 810, to UPSCD 420.

Figure 9:
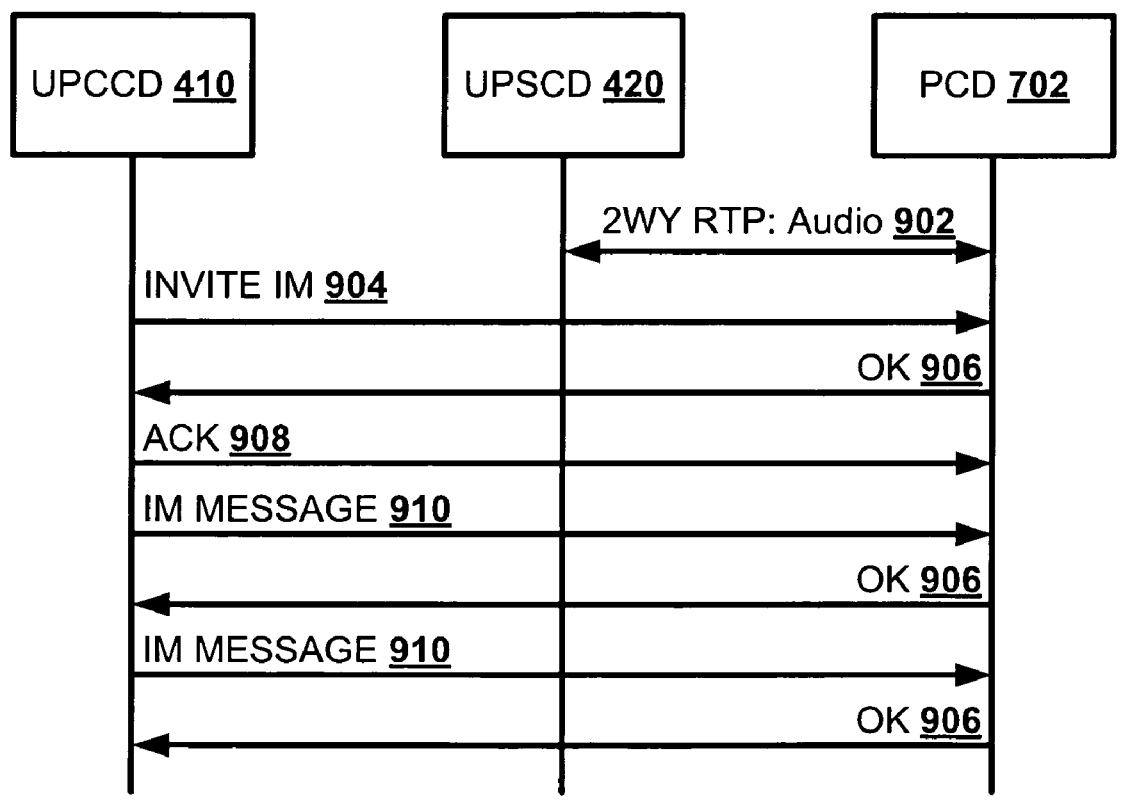
FIG. 9 illustrates, in a call flow diagram, one embodiment of a method for adding a second mode communication session, such as IM, to a multimodal conversation.

FIG. 9 illustrates in a call flow diagram one embodiment of a method 900 for adding a second mode, such as IM, to a multimodal conversation. UPCCD 410 may track the multimodal communication session by assigning a single conversation identifier (CID) to each mode of the communication session. PCD 702 and UPSCD 420 may be in a RTP media communication session 902, such as an audio communication session. UPCCD 410 may send a message, or an "INVITE IM" message 904, asking the communication partner to join a second mode communication session, such as an IM session, to PCD 702. PCD 702 may indicate receipt of the message 904 by sending an "OK" message 906 to UPCCD 410, which may in turn acknowledge receipt of that message 906 by returning an "ACK" message 908 to PCD 702. UPCCD 410 may then execute a second mode communication by sending an IM message 910 to PCD 702. PCD 702 may indicate receipt of the message by sending an "OK" message 906.

Figure 10:
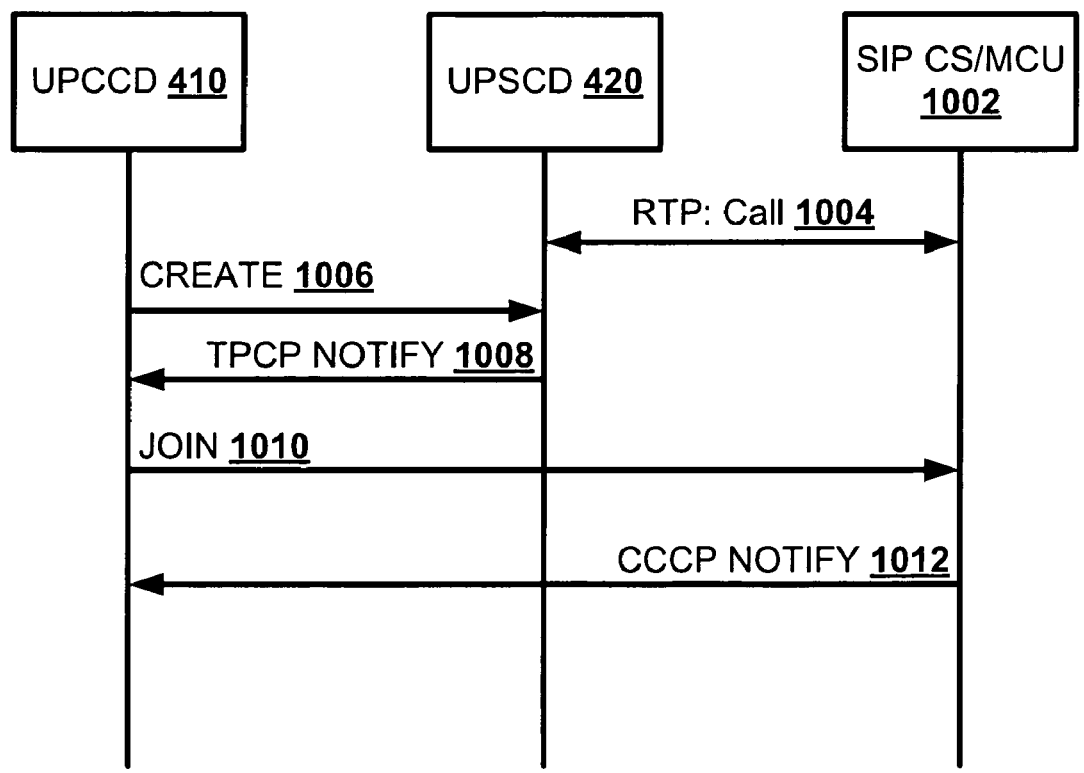
FIG. 10 illustrates, in a call flow diagram, one embodiment of a method for adding a paired communication device to a communication device in a conference communication session.

Paired communication devices may be used to carry on a joint conversation between multiple partners in multiple modes using a multimodal conference communication session. FIG. 10 illustrates, in a call flow diagram, one embodiment of a method 1000 for adding a UPCCD 410 to a UPSCD 420 already in a conference communication session. UPSCD 420 may be in a conference communication session with one or more communication partners using a conference server 1002, such as a session initiation protocol (SIP) conference server (CS) 1002 or a multipoint control unit (MCU) 1002. UPSCD 420 may be in a first mode RTP conference call session 1004 with SIP CS/MCU 1002, such as an audio communication session. UPCCD 410 may create a control channel to the UPSCD 420 by sending a "CREATE" request 1006 to the UPSCD 420. UPSCD 420 may send a TPCP "NOTIFY" message 1008 to UPCCD 410 that UPSCD 420 has joined a conference communication session. UPCCD 410 may join the conference communication session by sending a "JOIN" request 1010 to SIP CS/MCU 1002. SIP CS/MCU 1002 may send a centralized conference control protocol (CCCP) "NOTIFY" message 1012 to UPCCD 410 that UPSCD 420 is in the conference communication session.

Figure 11:
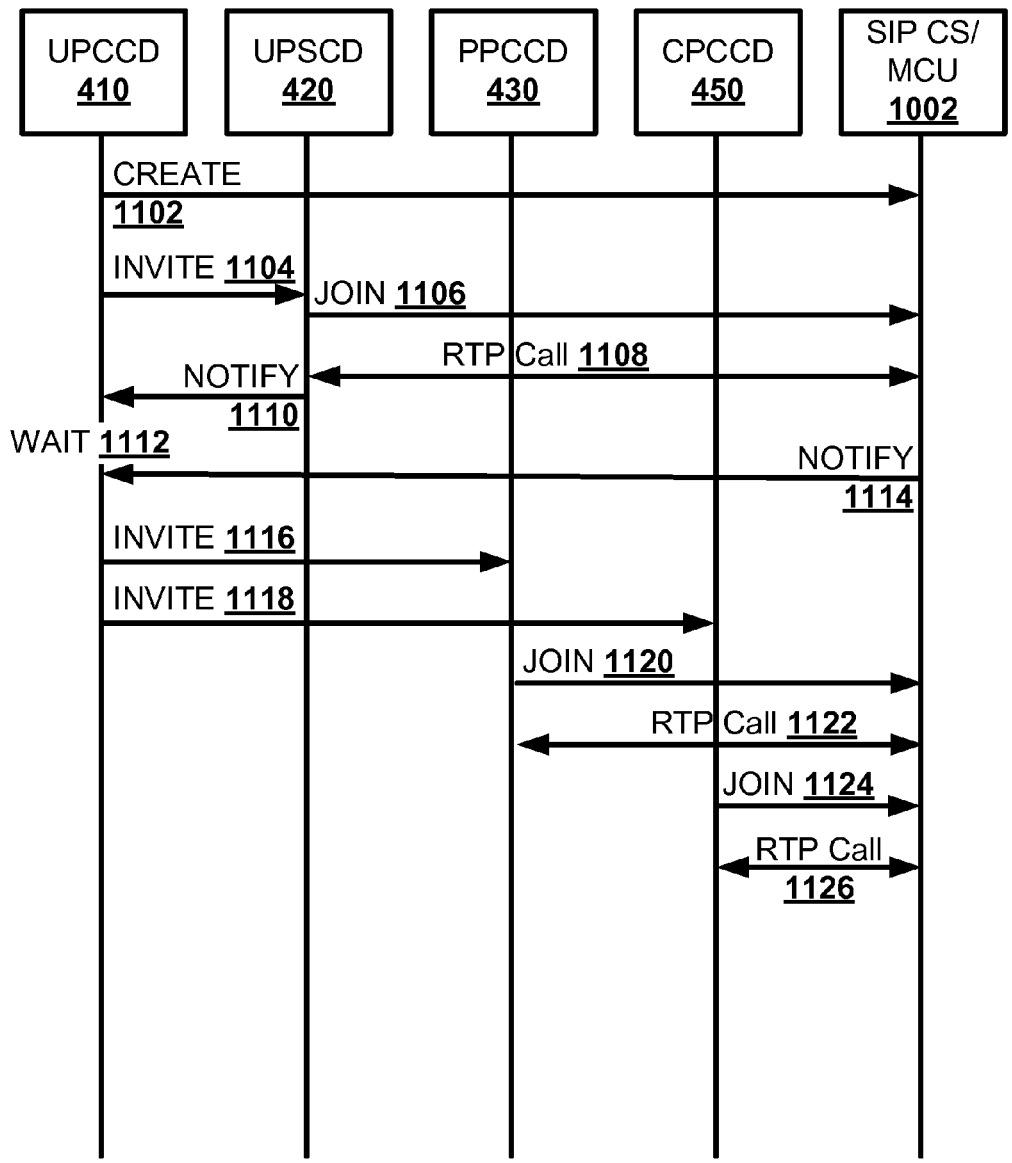
FIG. 11 illustrates, in a call flow diagram, one embodiment of a method for creating a conference communication session using a paired communication device.

FIG. 11 illustrates, in a call flow diagram, one embodiment of a method 1100 for creating a conference communication session using a paired communication device. UPCCD 410 may use SIP CS/MCU 1002 to create a conference communication session between UPSCD 420, a PPCCD 430, and a CPCCD 450. UPCCD 410 may create a conference communication session by sending a "CREATE" request 1102 to SIP CS/MCU 1002. UPCCD 410 may send an "INVITE" message 1104 to UPSCD 420, using a conference uniform resource identifier (URI), such as a global routable user agent (UA) URI (GRUU). UPSCD 420 may join the conference communication session by sending a "JOIN" request 1106 to SIP CS/MCU 1002. UPSCD 420 may start a RTP call communication session 1108 with SIP CS/MCU 1002. UPSCD 420 may send a TPCP "NOTIFY" message 1110 alerting UPCCD 410 that UPSCD 420 joined the conference communication session. UPCCD 410 may wait 1112 for a first mode, such as audio, from the conference communication session. SIP CS/MCU 1002 may send a CCCP "NOTIFY" message 1114 to UPCCD 410 indicating that audio mode has been added.

UPCCD 410 may send an "INVITE" message 1116 to PPCCD 430 and an "INVITE" message 1118 to CPCCD 450. PPCCD 430 may join the conference communication session by sending a "JOIN" request 1120 to SIP CS/MCU 1002. PPCCD 430 may start a RTP call communication session 1122 with SIP CS/MCU 1002. CPCCD 450 may join the conference communication session by sending a "JOIN" request 1124 to SIP CS/MCU 1002. CPCCD 450 may start a RTP call communication session 1126 with SIP CS/MCU 1002.

Figure 12:
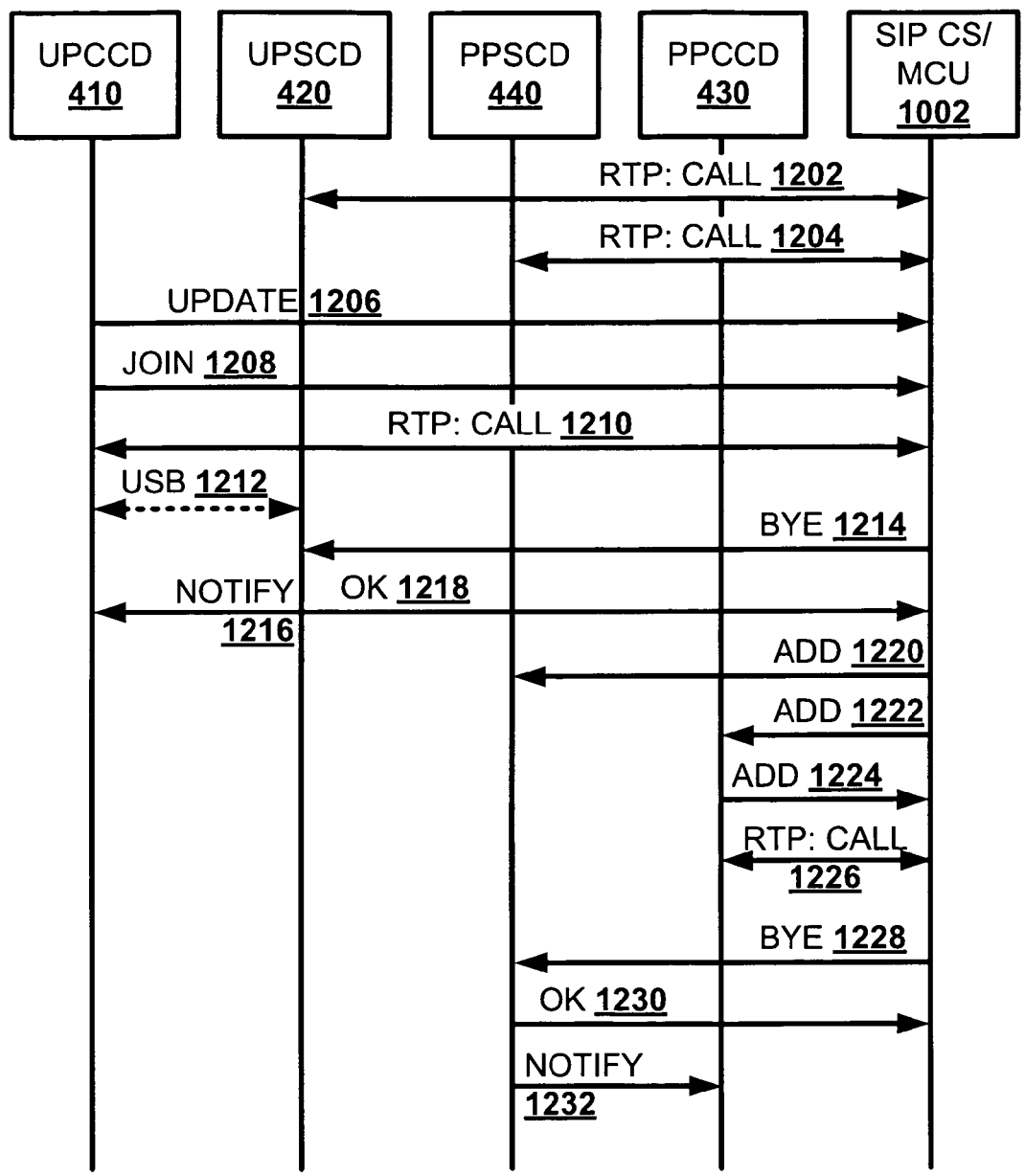
FIG. 12 illustrates, in a call flow diagram, one embodiment of a method for adding a second mode communication session, such as video, to a multimodal conference communication session.

FIG. 12 illustrates in a call flow diagram one embodiment of a method 1200 for adding a second mode, such as video communication session, to a multimodal conference communication session. UPCCD 410 and UPSCD 420 of a user may be in a call session with a PPCCD 430 and a PPSCD 440 associated with a communication partner. UPCCD 410 and UPSCD 420 may use SIP CS/MCU 1002 to control any audio sessions, audio-video (AV) sessions, or IM sessions. UPSCD 420 may be in a RTP media communication session 1202 with the SIP CS/MCU 1002, such as an audio communication, or call, session. PPSCD 440 may be also in a partner server media communication session 1204 with SIP CS/MCU 1002 using RTP, such as a call session. UPCCD 410 may add video to the communication session by sending an "UPDATE" message 1206 to the SIP CS/MCU 1002 to update the roster. UPCCD 410 may join the audio and video communication session by sending a "JOIN" request 1208 to SIP CS/MCU 1002. UPCCD 410 may be added to a media communication session 1210 with SIP CS/MCU 1002 using RTP, such as a video call session. UPCCD 410 may interact with UPSCD 420 via a USB connection 1212. Once the video call session 1210 is established, SIP CS/MCU 1002 may send an alert severing the RTP call session 1202, such as a "BYE" message 1214. UPSCD 420 may send a status message, such as a TPCP "NOTIFY" message 1216, notifying UPCCD 410 of the end of the RTP call session 1202. UPSCD 420 may also send a message acknowledging receipt of the alert 1218, such as an "OK" message 1218, to SIP CS/MCU 1002. SIP CS/MCU 1002 may send a first CCCP message, such as an "ADD" message 1220, to PPSCD 440 to notify the PPSCD 440 of the addition of a video conference. The SIP CS/MCU 1002 may send a second CCCP "ADD" message 1222 to PPCCD 430 to notify PPCCD 430 of the addition of a video conference. If the communication partner accepts, the communication partner may use the PPCCD 430 to send a message notifying SIP CS/MCU 1002 of the acceptance of the addition of video conferencing, such as a CCCP "ADD" message 1224. PPCCD 430 may be in a RTP media communication session 1226 with SIP CS/MCU 1002, such as a video call session. Once the RTP media communication session 1226 is established, SIP CS/MCU 1002 may send an alert severing call session 1204, such as a "BYE" message 1228. PPSCD 440 may send a message acknowledging receipt of the alert 1228, such as an "OK" message 1230, to SIP CS/MCU 1002. PPSCD 440 may send a status message, such as a TPCP "NOTIFY" message 1232 notifying PPCCD 430 that the media has been disconnected.

Figure 13:
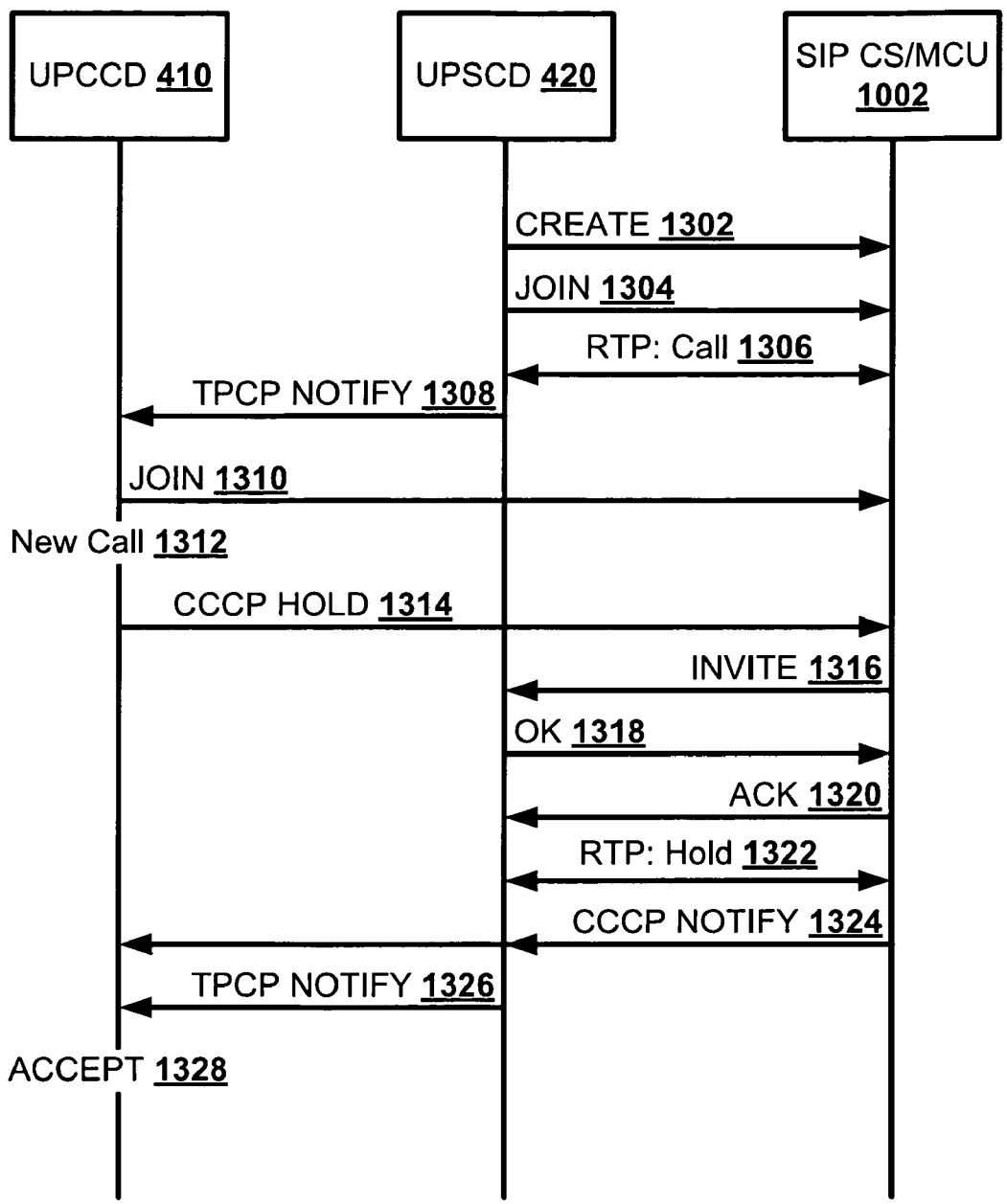
FIG. 13 illustrates, in a call flow diagram, one embodiment of a method 1300 for placing a conference communication session on hold.

In order to add a call to join a conference communication session after it has begun, a user may want to be able to place a conference communication session on hold. FIG. 13 illustrates, in a call flow diagram, one embodiment of a method 1300 for placing a conference communication session on hold. UPSCD 420 may create a conference communication session by sending a "CREATE" request 1302 and a "JOIN" request 1304 to SIP CS/MCU 1002. UPSCD 420 may start a RTP conference call communication session 1306 with SIP CS/MCU 1002. UPSCD 420 may send a TPCP "NOTIFY" message 1308 alerting UPCCD 410 that UPSCD 420 joined the conference communication session. UPCCD 410 may join the conference communication session by sending a "JOIN" request 1310 to SIP CS/MCU 1002, requesting to join the conference roster.

UPCCD 410 may receive a new call 1312 from a new communication partner. UPCCD 410 may send a CCCP "HOLD" request 1314 to SIP CS/MCU 1002. SIP CS/MCU 1002 may send an "INVITE" message 1316 to UPSCD 420 to alert USPCD 420 that the conference communication session may be temporarily inactive. UPSCD 420 may send an "OK" message 1318 to SIP CS/MCU 1002, which may return an "ACK" message 1320 acknowledging receipt. SIP CS/MCU 1002 may place the conference communication session on hold 1322. SIP CS/MCU 1002 may send a CCCP "NOTIFY" message 1324 to UPSCD 420 and UPCCD 410 to alert them that the conference communication session is on hold. UPSCD 420 may send a TPCP "NOTIFY" message 1326 to UPCCD 410 to alert it that the conference communication session is on hold. UPCCD 410 may accept 1328 the second call.

A user may escalate a normal multimodal conversation to a multimodal conference communication session from a variety of scenarios. FIG. 14a illustrates, in a block diagram, an initial double paired configuration 1400 in which a user, associated with UPCCD 410 paired with UPSCD 420, may be in a communication session with a communication partner, associated with PPCCD 430 paired with PPSCD 440. FIG. 14b illustrates, in a block diagram, an initial paired-unpaired configuration 1410 in which a user, associated with UPCCD 410 paired with UPSCD 420, may be in a communication session with a communication partner, associated with a first PCD 702 unpaired with a second PCD 702. FIG. 14c illustrates, in a block diagram, an initial pivot configuration 1420 in which a user, associated with UPCCD 410 paired with UPSCD 420, may be in a communication session with a communication partner, associated with PCD 702.

FIG. 15 illustrates in a call flow diagram one embodiment of a method 1500 for adding a conferencing communication partner. UPCCD 410 and UPSCD 420 may be in a call session with a PPCCD 430 and a PPSCD 440 associated with a communication partner. UPCCD 410 may be in a first media communication session 1502, such as an IM session, with PPCCD 430. UPSCD 420 may be in a second media communication session 1504, such as a RTP call session, with PPSCD 440. UPCCD 410 may add a conference communication partner by sending a message to create a conference and join an IM session, sending a "CREATE" request 1506 and a "JOIN" request 1508 to SIP CS/MCU 1002. UPCCD 410 may send an "INVITE" message 1510 to UPSCD 420. UPSCD 420 may send a "JOIN" request 1512 to SIP CS/MCU 1002, requesting to join the conference and the audio session. SIP CS/MCU 1002 may add UPSCD 420 to the RTP conference media communication session 1514, such as an audio session, and place the connection on hold. UPCCD 410 then may wait 1516 for the conference audio while UPSCD 420 may wait 1518 for conference IM.

MCU 1002 may send a "NOTIFY" message 1520 to UPCCD 410 and UPSCD 420 to alert the user that the user has joined the audio and IM session. UPCCD 410 may send an "INVITE" message 1522 to PPCCD 430 to join the IM session and an "INVITE" message 1524 to PPSCD 440 to join the audio session. UPCCD 410 may then wait 1526 for the communication partner to join the conference audio and IM while UPSCD 420 may wait 1528 for the communication partner to join the conference audio and IM.

PPCCD 430 may send a "JOIN" request 1530 to request access to the conference communication session and the IM session. PPSCD 440 may send a "JOIN" request 1532 to request access to the conference communication session and the audio session. SIP CS/MCU 1002 may send a "NOTIFY" message 1534 to UPCCD 410 and UPSCD 420 to alert the user that the communication partner has joined the audio and IM session. PPCCD 430 may send a "BYE" message 1536 to UPCCD 410 to alert UPCCD 410 that the IM session 1502 has been discontinued. UPSCD 420 may send a "BYE" message 1538 to PPSCD 440 to alert PPSCD 440 that the audio session 1504 has been discontinued. UPSCD 420 and PPSCD 440 may request that the call session be taken off hold 1540, creating a RTP call session 1542 between UPSCD 420 and SIP CS/MCU 1002 and a RTP call session 1544 between PPSCD 440 and SIP CS/MCU 1002. UPSCD 420 may send a "NOTIFY" message 1546 to UPCCD 410 to alert UPCCD 410 that the call session 1542 has been established. PPSCD 440 may send a "NOTIFY" message 1548 to PPCCD 430 to alert PPCCD 430 that the call session 1544 has been established.

FIG. 16 illustrates, in a call flow diagram, one embodiment of a method 1600 for merging two call sessions into a conference communication session. UPSCD 420 may have an active first RTP call communication session 1602 with CPCCD 450 and a second RTP call communication session 1604 with PPCCD 450 on hold. UPSCD 420 may begin a conference communication session by sending a "CREATE" request 1606 and a "JOIN" request 1608 to SIP CS/MCU 1002. SIP CS/MCU 1002 may a create RTP call communication session 1610 with UPSCD 420, placing RTP call communication session 1610 on hold. UPSCD 420 may send an "INVITE" message 1612 to CPCCD 450, alerting CPCCD 450 to the conference communication session. CPCCD 450 may join the conference communication session by sending a "JOIN" request 1614 to SIP CS/MCU 1002, requesting to join the conference roster. CPCCD 450 may join a RTP call communication session 1616 with SIP CS/MCU 1002, RTP call communication session 1616 being on hold. SIP CS/MCU 1002 may send a CCCP "NOTIFY" message 1618 to UPSCD 420 and CPCCD 450 to alert them that CPCCD 450 has joined the conference communication session. CPCCD 450 may send a "BYE" message 1620 to UPSCD 420 to signal intent to end first call communication session 1602. UPSCD 420 may send an "OK" message 1622 to CPCCD 450 to accept ending first call communication session 1602. UPSCD 420 may send an "UNHOLD" request 1624 to SIP CS/MCU 1002 to take RTP call communication session 1610 off hold. CPCCD 450 may send an "UNHOLD" request 1626 to SIP CS/MCU 1002 to take RTP call communication session 1616 off hold. UPSCD 420 may send a TPCP "NOTIFY" message 1628 to UPCCD 410 to alert it that UPSCD 420 has joined the conference communication session with CPCCD 450.

UPSCD 420 may send an "INVITE" message 1630 to PPCCD 430, alerting PPCCD 430 to the conference communication session. PPCCD 430 may join the conference communication session by sending a "JOIN" request 1632 to SIP CS/MCU 1002, requesting to join the conference roster. PPCCD 430 may join a RTP call communication session 1634 with SIP CS/MCU 1002, RTP call communication session 1634 being on hold. SIP CS/MCU 1002 may send a CCCP "NOTIFY" message 1636 to UPSCD 420, PPCCD 430, and CPCCD 450 to alert them that PPCCD 430 has joined the conference communication session. PPCCD 430 may send a "BYE" message 1638 to UPSCD 420 to signal intent to end first call communication session 1604. UPSCD 420 may send an "OK" message 1640 to PPCCD 430 to accept ending first RTP call communication session 1604. UPSCD 420 may send a TPCP "NOTIFY" message 1642 to UPCCD 410 to alert it that UPSCD 420 has ended call communication session with PPCCD 430. PPCCD 430 may send an "UNHOLD" request 1644 to SIP CS/MCU 1002 to take RTP call communication session 1634 off hold. UPCCD 410 may send a "JOIN" request 1646 to SIP CS/MCU 1002, requesting to join the conference roster.

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method for a multimodal conversation, comprising:
   pairing a user paired controller communication device and a user paired server communication device to act as an integrated system, the user paired controller communication device and the user paired server communication device being independent communication devices with respective points of presence, the pairing comprising:
      selecting, by the user paired controller communication device, either a previously indicated user paired server communication device or an available user paired server communication device as the user paired server communication device, the selected user paired server communication device being connected to the user paired controller communication device via a data connection and being controlled by the user paired controller communication device; and
   directing, by the user paired controller communication device, the user paired server communication device to create a first mode communication session of the multimodal conversation with a partner communication device, the partner communication device being a communication device other than the user paired controller communication device and the user paired server communication device; and
   executing, on the user paired controller communication device, a second mode communication session of the multimodal conversation with the partner communication device.

2. The method of claim 1, further comprising:
   receiving, by the user paired controller communication device from a user, a request to establish the first mode communication session.

3. The method of claim 1, wherein the second mode communication session is a video communication session.

4. The method of claim 1, further comprising:
   directing, by the user paired controller communication device, the user paired server communication device to include a conferencee paired server communication device into a conference with the user paired server communication device and the partner communication device via the first mode communication session, wherein
   the partner communication device is paired with a second partner communication device.

5. The method of claim 1, further comprising:
   merging the first mode communication session with an external first mode communication session to create a conference communication session.

6. A user paired controller communication device, comprising:
   a communication interface to communicate with a user paired server communication device, the user paired controller communication device and the user paired server communication device being independent communication devices acting as an integrated system, each of the user paired controller communication device and the user paired server communication device having a respective point of presence;
   a processor;
   a memory or a read only memory having instructions stored therein for execution by the processor, such that execution of the instructions by the processor causes the processor to perform a method comprising:
      selecting, by the user paired communication device, either a previously indicated user paired server communication device or an available user paired server communication device as the user paired server communication device, the selected user paired server communication device being connected to the user paired controller communication device via a data connection and being controlled by the user paired controller communication device,
      directing, by the user paired controller communication device, the user paired server communication device to create a first mode communication session of the multimodal conversation with a partner communication device, the partner communication device being a communication device other than the user paired controller communication device and the user paired server communication device, and
      executing a second mode communication session of the multimodal conversation with the partner communication device, the partner communication device being a communication device other than the user paired controller communication device and the user paired server communication device; and
   the user paired controller communication device further comprising a bus connecting the processor with the communication interface and with the memory or the read only memory.

7. The user paired controller communication device of claim 6, further comprising:
   a user input device to receive a user request to establish the first mode communication session.

8. The user paired controller communication device of claim 6, wherein the communication interface is at least one of a universal serial bus port, an Ethernet connection creating a peer-to-peer connection, or a Bluetooth® connection.

9. The user paired controller communication device of claim 6, wherein the communication interface pairs with a user paired ancillary communication device.

10. The user paired controller communication device of claim 6, further comprising:
    a user output device to display a state of the first mode communication session based on a status update message received from the user paired server communication device.

11. The user paired controller communication device of claim 6, wherein the communication interface directs the user paired server communication device to merge the first mode communication session with an external first mode communication session to create a conference communication session.

12. The user paired controller communication device of claim 11, wherein the communication interface places the conference communication session on hold.

13. The user paired controller communication device of claim 6, wherein the processor executes a first controller point of presence to execute the second mode communication session and a second controller point of presence to execute a third mode communication session of the multimodal conversation.

14. A user paired server communication device, comprising:
    a processor; and
    a communication interface to communicate with a user paired controller communication device executing a second mode communication session of a multimodal conversation, the user paired server communication device and the user paired controller communication device being independent communication devices acting as an integrated system when paired;

a memory or a read only memory having instructions stored therein, such that when the instructions are executed by the processor, the processor performs a method comprising:
  permitting the user paired server communication device to be controlled by the user paired controller communication device, and
  executing a first mode communication session of the multimodal conversation with a partner communication device, the partner communication device being a communication device other than the user paired server communication device and the user paired controller communication device, the first mode communication session having been created by the user paired server communication device as a result of the user paired controller communication device directing the user paired server communication device to create the first mode communication session; and
the user paired server communication device further comprising a bus connecting the processor with the communication interface and with the memory or the read only memory.

15. The user paired server communication device of claim 14, wherein the communication interface receives from the user paired controller communication device a user request to establish the first mode communication session.

16. The user paired server communication device of claim 14, wherein the communication interface is at least one of a universal serial bus port, an Ethernet connection creating a peer-to-peer connection, or a Bluetooth® connection.

17. The user paired server communication device of claim 14, wherein the communication interface pairs with a user paired ancillary communication device.

18. The user paired server communication device of claim 14, wherein the communication interface sends a status update message to the user paired controller communication device.

19. The user paired server communication device of claim 14, wherein the communication interface merges the first mode communication session with an external first mode communication session to create a conference communication session.

20. The user paired server communication device of claim 14, wherein the processor executes a first server point of presence to execute the first mode communication session and a second server point of presence to execute a third mode communication session of the multimodal conversation.

* * * * *